(Model.)
J. D. BUICE.
Filter for Coffee.
No. 233,598.        Patented Oct. 26, 1880.
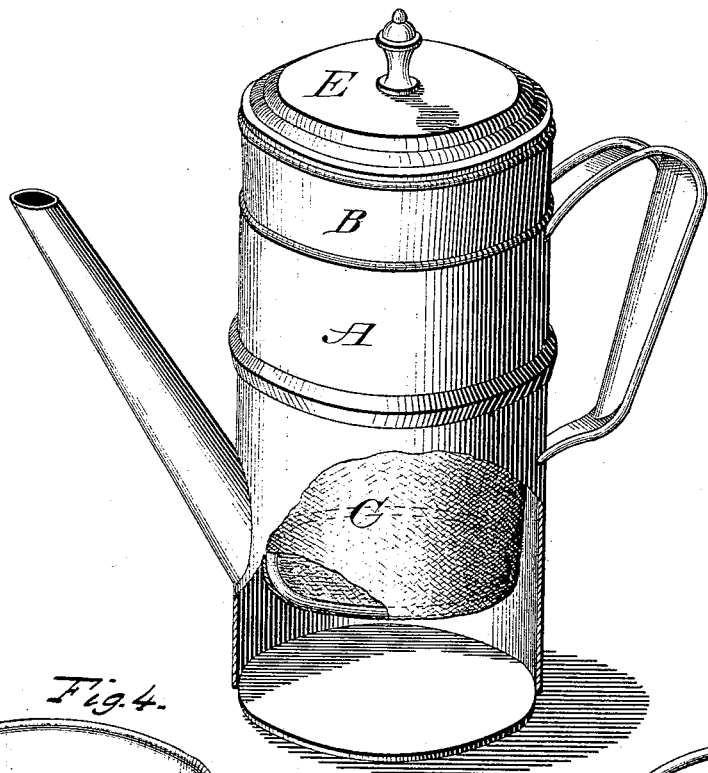
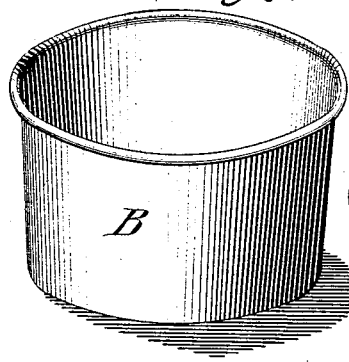
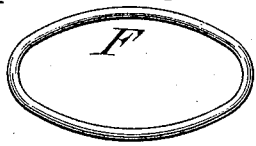
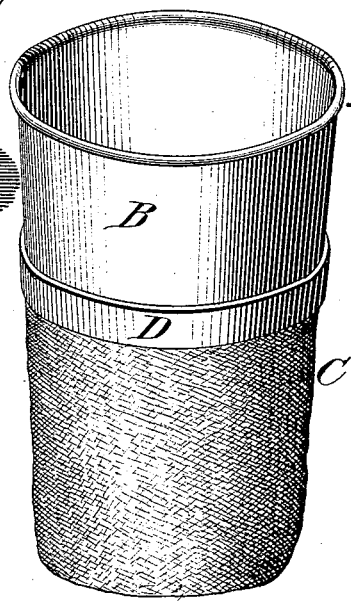
Attest:
T. J. Henwell
Henry C. Butler
Inventor:
James D. Buice

UNITED STATES PATENT OFFICE.

JAMES D. BUICE, OF LA GRANGE, GEORGIA.

FILTER FOR COFFEE.

SPECIFICATION forming part of Letters Patent No. 233,598, dated October 26, 1880.

Application filed July 29, 1880. (Model.)

*To all whom it may concern:*

Be it known that I, JAMES D. BUICE, of La Grange, in the county of Troup and State of Georgia, have invented certain new and useful Improvements in Filters for Coffee, Tea, &c.; and I do hereby declare that the following is a full, clear, and exact description thereof, sufficient to enable others skilled in the art to which it appertains to make and use the same, reference being had to the accompanying drawings, in which—

Figure 1 is a perspective view of my invention applied to a tea or coffee pot. Fig. 2 is a similar view of the filter itself, and Figs. 3 and 4 are detail perspective views of the filter.

Same part in the several figures is denoted by the same letter.

This invention has relation to improvements in coffee, tea, or other filters; and it consists in combining with the textile receptacle or filter proper a ring adapted to distend the bottom of the filter, substantially as hereinafter more fully set forth.

In the accompanying drawings, A indicates the tea or coffee pot of ordinary construction.

B is the upper part of the filter, which consists of a thimble-shaped hoop with its sides flaring upwardly to enable it, when inserted into the coffee or tea pot, to be supported upon and to stand above the upper edge of the pot, to permit the filter to be inserted into and removed from the pot without having to reach into the pot. This construction also allows the cover E of the pot, removed therefrom, to be placed upon the hoop, as shown in Fig. 1.

C is the textile portion or filtering medium of the filter, which is secured upon the hoop B by means of the band D, as seen in Fig. 2. Within the bottom of the part C is inserted a ring, E, adapted to distend it, and thus enlarge its bottom surface, and, by stretching it, facilitate the filtering of the substance placed in the bag or filter proper, C.

I am aware that it is old to form the bottom separate from the filter, and at the point of union to provide inwardly-projecting portions of the material that may serve in a measure to hold the bottom in proper position.

Having thus fully described my invention, I claim and desire to secure by Letters Patent—

In a filter, the combination, with the textile receptacle or filter proper, C, of the ring F, inserted into and adapted to distend the bottom of the receptacle, for the purpose specified.

JAMES D. BUICE.

Witnesses:
THOMAS J. HARWELL,
HENRY C. BUTLER.